(12) United States Patent
Gemelos

(10) Patent No.: US 8,996,051 B1
(45) Date of Patent: Mar. 31, 2015

(54) SATELLITE SYSTEM RESOURCE ALLOCATION OPTIMIZATION

(71) Applicant: Space Systems/Loral, LLC, Palo Alto, CA (US)

(72) Inventor: Erin Gemelos, Valencia, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 198 days.

(21) Appl. No.: 13/793,922

(22) Filed: Mar. 11, 2013

(51) Int. Cl.
*H04W 72/04* (2009.01)

(52) U.S. Cl.
CPC .................................. *H04W 72/04* (2013.01)
USPC ............ 455/509; 455/12.1; 455/77; 370/316; 370/329

(58) Field of Classification Search
CPC .................................................. H04W 72/04
USPC .................... 455/509, 12.1, 77; 370/316, 329
See application file for complete search history.

(56) References Cited

U.S. PATENT DOCUMENTS

| | | | | |
|---|---|---|---|---|
| 8,265,646 B2 * | 9/2012 | Agarwal | ..................... | 455/452.1 |
| 8,311,006 B2 * | 11/2012 | Agarwal | ....................... | 370/329 |
| 8,325,664 B2 | 12/2012 | Agarwal | | |
| 8,351,383 B2 * | 1/2013 | Agarwal | ....................... | 370/329 |
| 8,634,296 B2 * | 1/2014 | Agarwal | ....................... | 370/235 |
| 2001/0043575 A1 | 11/2001 | Kelly | | |
| 2003/0236854 A1 | 12/2003 | Rom et al. | | |
| 2010/0103866 A1 | 4/2010 | Reichman | | |
| 2010/0120359 A1 | 5/2010 | Agarwal | | |

OTHER PUBLICATIONS

Iiduka, Hideaki et al., "Fixed Point Optimization Algorithms for Network Bandwidth Allocation Problems with Compoundable Constraints", IEEE Communications Letters, vol. 15, No. 6, Jun. 2011, 3 pages.

* cited by examiner

*Primary Examiner* — Bobbak Safaipour
(74) *Attorney, Agent, or Firm* — Weaver Austin Villeneuve & Sampson LLP

(57) ABSTRACT

Resource allocation to user terminals of a satellite system is optimized, the user terminals configured for data communication with a satellite via a common antenna beam. A resource is allocated, within the common antenna beam, to each user terminal i such that, when total available bandwidth A of the common antenna beam is not less than the total desired bandwidth $\Omega = \sum_{i=1}^{n} \omega_i$ of the antenna beam, $b_i$ is no less than $\omega_i$, where: $\omega_i$ is bandwidth demand at user terminal i, approximately equal to $T_{i\text{-}des}/s_i$; $T_{i\text{-}des}$ is proportional to a throughput requirement by user terminal i; and $s_i$ is an estimated spectral efficiency of user terminal i. When A is less than $\Omega$, bandwidth $b_i$ is allocated to each user terminal such that a number of user terminals supplied respective bandwidth not less than $\omega_i$ is maximized.

15 Claims, 3 Drawing Sheets

SATELLITE SYSTEM RESOURCE ALLOCATION OPTIMIZATION

TECHNICAL FIELD

This invention relates generally to data communications in a satellite communications system, and in particular, to techniques for optimizing allocation of system resources to user terminals.

BACKGROUND

The assignee of the present invention manufactures and deploys spacecraft for, inter alia, broadband data communications services from geosynchronous orbit. Market demands for such spacecraft have imposed increasingly stringent requirements on spacecraft payloads. For example, broadband service providers desire spacecraft with payloads offering dynamically scalable data rates to a large number of user terminals.

A multi-beam antenna (MBA) system generates a set of user spot beams that define a coverage area which may extend, in aggregate, across a large region on the ground. Within any given spot beam, a large and dynamically varying number of user terminals may be simultaneously demanding system resources (bandwidth or other antenna beam resource). Moreover, the demand from any individual user terminal will vary temporally and/or spatially as the user terminal experiences variations in signal to noise ratio (SNR) and/or (for a mobile user terminal) moves about within or between spot beams.

Optimization techniques applied to the problem of bandwidth allocation are disclosed, for example by Iiduka, et al., in "Fixed Point Optimization Algorithms for. Network Bandwidth Allocation Problems with Compoundable Constraints," by Goode, U.S. Pat. No. 6,718,552, and by Kelly, U.S. Pat. Pub. No. 20010043575, the disclosures of which are hereby incorporated by reference in their entirety into the present patent application.

The above mentioned techniques attempt to optimize network bandwidth utilization, but do not necessarily optimize the experience of the users (customers). As a result, an improved approach to dynamically assigning bandwidth or other system resources to user terminals is desirable.

SUMMARY

The present inventors have appreciated that resource allocation to users may be optimized by minimizing the number of "unsatisfied users" at any moment of time. Bandwidth is an important example of a system resource, with respect to which an "unsatisfied" user may be defined as one that is provided a bandwidth less than a desired bandwidth $\omega_{des} = T_{des}/s$, where $T_{des}$ is the throughput desired by the user, and s is the spectral efficiency of the user's user terminal. A "satisfied" user, on the other hand, is one that is provided a bandwidth greater than or equal to $\omega_{des}$. When total available bandwidth A is not less than aggregate desired bandwith $\Omega$, the bandwidth demand for each user terminal or element is at least satisfied. When A is less $\Omega$, however, bandwidth is allocated to each user terminal such that an aggregate number of user terminals that are supplied respective bandwidth not less than respective $\omega_{des}$ is maximized.

In an embodiment, resources are allocated to each of a plurality of user terminals, the user terminals being configured for data communication with a satellite via a common antenna beam. A bandwidth $b_i$ is dynamically allocated, within the common antenna beam, to each user terminal i such that, when total available bandwidth A of the common antenna beam is not less than the total desired bandwidth $\Omega = \Sigma_{i=1}^{n} \omega_i$ of the antenna beam, $b_i$ is no less than $\omega_i$, where: $\omega_i$ is bandwidth demand at user terminal i, approximately equal to $T_{i\text{-}des}/s_i$; $T_{i\text{-}des}$ is proportional to a throughput requirement by user terminal i; and $s_i$ is an estimated spectral efficiency of user terminal i. When A is less than $\Omega$, bandwidth $b_i$ is allocated to each user terminal such that the aggregate number of user terminals supplied respective bandwidth not less than $\omega_i$ is maximized.

In an embodiment, $b_i$ may be no greater than $A/\Omega \times \omega_i$.

In another embodiment, when A is less than $\Omega$, a first portion $A_1$ of bandwidth A may be assigned to satisfy respective bandwidth demand $\omega_i$ of each user terminal of a first subset of the user terminals and a second portion $A_2$ of bandwidth A may be proportionately assigned to partially satisfy each user terminal of a second subset of the user terminals. Advantageously, no user terminal in the first subset of user terminals has a respective bandwidth demand greater than a respective bandwidth of any user terminal in the second subset of terminals.

In an embodiment, a hierarchical ordering of user terminals may be generated on the basis of a respective $\omega_i$ such that $\omega_1 \leq \omega_2 \leq \omega_3 \leq \ldots \leq \omega_n$, where: for a first subset of user terminals, for which $\omega_j$ is not greater than $A - \Sigma_{i=1}^{k-1} \omega_i$, each terminal in the first subset is allocated respective bandwidth $b_j$ of not less than $\omega_j$; and for a second subset of user terminals, for which $\omega_k$ is greater than $A - \Sigma_{i=1}^{k-1} \omega_i$, a remaining bandwidth $\hat{A} = A - \Sigma_{i=1}^{k-1} \omega_i$ is allocated to one or more of user terminals in the second subset.

In a further embodiment, the remaining bandwidth $\hat{A}$ may be allocated to each of the one or more user terminals in the second subset such that the allocated respective bandwidth $b_k$ for each user terminal in the second subset of terminals is approximately $\hat{A} \times \omega_i / \Sigma_{i=k}^{n} \omega_i$.

In an embodiment, resources are allocated to each of a plurality of user terminals, the user terminals configured for data communication with a satellite via a common antenna beam. A resource $r_i$ may be dynamically allocated to each user terminal i such that, when the total resource A allocated to the antenna beam is not less than the total desired resource $\Omega$ of the antenna beam, $r_i$ is approximately equal to $A/\Omega \times \omega_i$, where $\omega_i$ is resource demand at user terminal i, approximately proportional to $d_i/s_i$, where $d_i$ is proportional to a throughput requirement per user terminal i and $s_i$ is an estimated spectral efficiency at user terminal i. When A is less than $\Omega$, resource $r_i$ may be allocated to each user terminal such that an aggregate number of user terminals supplied a respective resource not less than $\omega_i$, is maximized.

In an embodiment, a satellite is configured for data communication via a common antenna beam with a plurality of user terminals. The satellite and the plurality of user terminals are communicatively coupled with a controller, the controller configured to control the allocation of resources to each of a plurality of user terminals, by dynamically allocating, within the common antenna beam, a bandwidth $b_i$ to each user terminal i such that, when total available bandwidth A of the common antenna beam is not less than the total desired bandwidth $\Omega = \Sigma_{i=1}^{n} \omega_i$ of the antenna beam, $b_i$ is no less than $\omega_i$, where: $\omega_i$ is bandwidth demand at user terminal i, approximately equal to $T_{i\text{-}des}/s_i$; $T_{i\text{-}des}$ is proportional to a throughput requirement by user terminal i; and $s_i$ is an estimated spectral efficiency of user terminal i. When A is less than $\Omega$, bandwidth $b_i$ may be allocated to each user terminal such that an aggregate number of user terminals supplied respective bandwidth not less than $\omega_i$, is maximized.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1A:
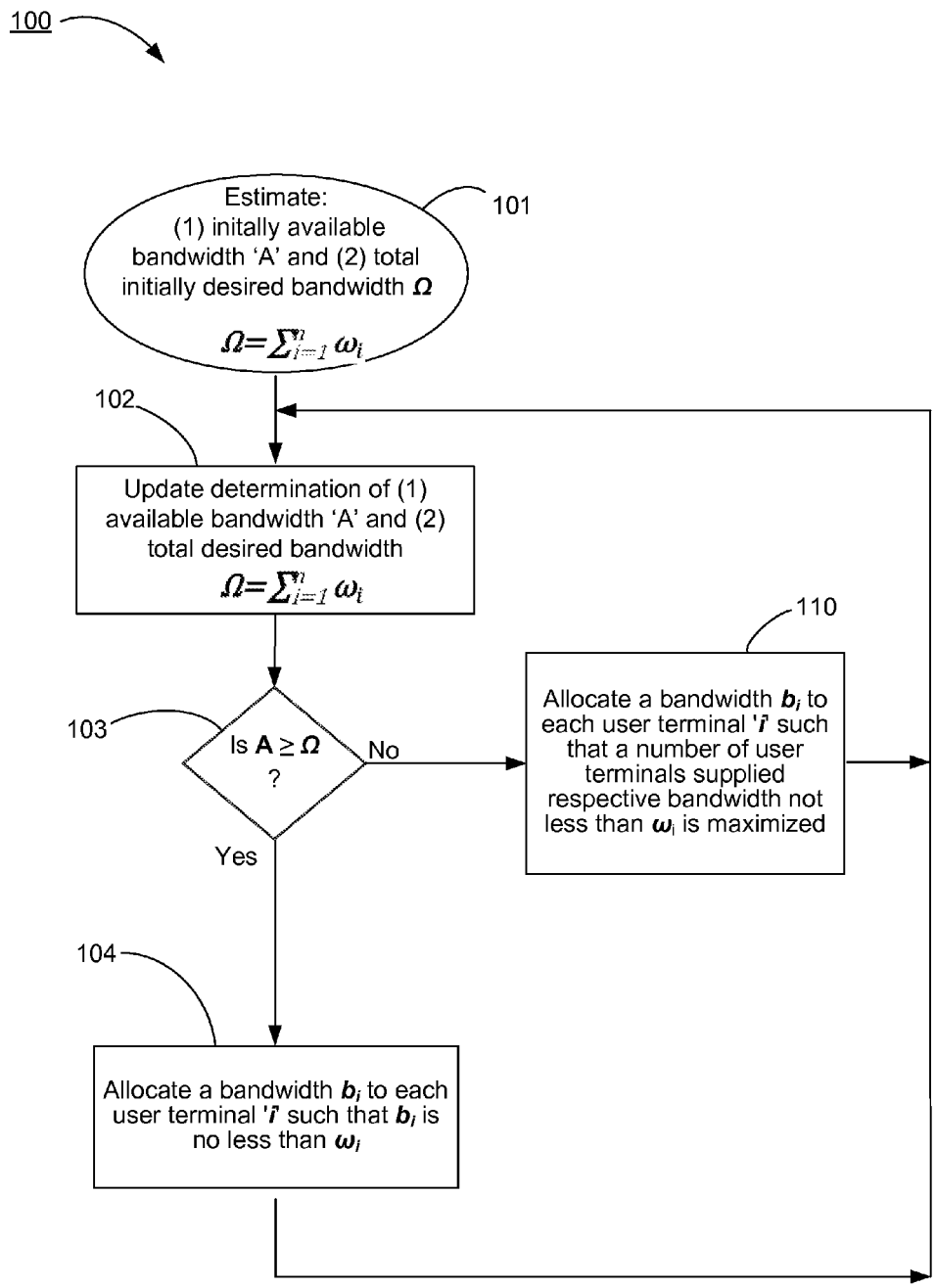
FIG. 1A and FIG. 1B show an example of a flow diagram illustrating an optimized technique for allocating a satellite system resource according to an embodiment.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The present inventor has developed improved system resource assignment techniques for a multi beam antenna system. The techniques optimize resource assignment by minimizing the number of "unsatisfied users" at any moment of time. Bandwidth is an important example of a system resource, with respect to which an "unsatisfied" user may be defined as one that is provided a bandwidth less than $\omega_{des}=T_{des}/s$, where $T_{des}$ is the throughput desired by the user, and s is the spectral efficiency of the user's user terminal. A "satisfied" user, on the other hand, is one that is provided a bandwidth greater than or equal to $\omega_{des}$. It will be appreciated that s may vary temporally and/or as a function of user terminal location within the beam, or other factors.

A total bandwidth demand in a given beam may be defined as $\Omega=\Sigma_{i=1}^{n} \omega_i$, where n is the number of elements, for example, the number of user terminals, assigned to the beam, and $\omega_i$ is the bandwidth desired at user terminal i, defined as $\omega_i=T_{i-des}/s_i$ where is the $T_{i-des}$ is the throughput desired by element i, and $s_i$ is the estimated spectral efficiency of user terminal i.

Where the total available bandwidth is represented by A, if $A \geq \Omega$ (i.e. the bandwidth available is at least sufficient to meet the bandwidth demand), bandwidth may be assigned to each user terminal proportionately to the bandwidth desired per element as follows: $b_i=A/\Omega \times \omega_i$, where $b_i$ is the bandwidth assigned to user terminal i.

Put shortly, where $A \geq \Omega$, the bandwidth demand for each user terminal or element is satisfied, and an excess available bandwidth may be allocated proportionally to demand.

Where $A<\Omega$, however, the total bandwidth allotted to the beam is insufficient to meet the desired throughput of every element/user terminal. In such case, advantageously, the bandwidth $b_i$ allocated to each user terminal is determined such that a number of user terminals supplied respective bandwidth not less than $\omega_i$, is maximized.

In an embodiment, in order to maximize the number of elements that achieve their respective desired throughput, bandwidth is first assigned to the elements that require the least amount of bandwidth to meet their desired throughput requirement, and then the remaining bandwidth is proportionately assigned to the elements whose throughput requirements will not be met. For example, bandwidth may be allocated to elements on a hierarchical basis according to a respective $\omega_i=T_{i-des}/s_i$. It will be appreciated that parameters $T_{i-des}$ and $s_i$ may vary dynamically with time, in manner that is not predictable a priori. As a result, the hierarchical allocation of bandwidth may, advantageously, also be dynamically adjusted in real or near real time.

In an embodiment, hierarchical allocation of bandwidth may be accomplished in the following manner. Bandwidth may assigned to each element/user terminal on a priority basis such that, where $\omega_1 \leq \omega_2 \leq \omega_3 \leq \ldots \leq \omega_n$, demand of terminal 1 is fully satisfied first, before any bandwidth is allocated to terminal 2; then the demand of terminal 2 is fully satisfied before any bandwidth is allocated to terminal 3, and so on. Thus, for a first subset of user terminals, including terminals 1 through j where $\omega_j$ is not greater than $A-\Sigma_{i=1}^{j-1} \omega_i$, each user terminal may be allocated respective bandwidth $b_i$ no less than $\omega_i=T_{i-des}/s_i$. Advantageously, $b_i$ may be approximately equal to $\omega_i$. For a second subset of user terminals, where $\omega_k$ is greater than $A-\Sigma_{i=1}^{k-1} \omega_i$, each user terminal may be allocated respective bandwidth $b_i=\hat{A} \times \omega_i/\Sigma_{i=k}^{n} \omega_i$, where $\hat{A}=A-\Sigma_{i=1}^{k-1} \omega_i$.

Put shortly, when $A<\Omega$, the bandwidth demand for each user terminal in the first subset is satisfied, and each user terminal in the second subset is allocated a portion of the remaining bandwidth proportionate to its demand.

FIG. 1A shows an example of a flow diagram illustrating an optimized technique for allocating bandwidth according to an embodiment. In an embodiment, method 100 may be performed by a satellite system controller, a processor or computer apparatus located on the ground, at for example, a control center, or on a satellite.

Method 100 may begin at block 101, where an estimate may be made of (1) initially available bandwidth A and (2) total initially desired bandwidth $\Omega$, where $\Omega=\Sigma_{i=1}^{n} \omega_i$ and $\omega_i=T_{i-des}/s_i$. Advantageously, estimates of A and $\Omega$ may be updated dynamically in real, or near real time, based, for example, on continuously or frequently updated values of n, $T_{i-des}$, and $s_i$.

At block 102, for example, an updated determination may be made of (1) available bandwidth A and (2) total desired bandwidth $\Omega$.

At block 103, a decision may be made as to whether or not $A>\Omega$. If $A>\Omega$, then method 100 may proceed to block 104 and allocate a bandwidth $b_i$ to each user terminal i such that $b_i$ is no less than than $\omega_i$. On the other hand, if $A<\Omega$, method 100 may proceed to block 110 and allocate a bandwidth $b_i$ to each user terminal i such that an aggregate number of user terminals supplied respective bandwidth not less than $\omega_i$ is maximized.

Advantageously, after executing either of block 104 or block 110, method 100 may return to block 102, either immediately, or following a set time delay (not shown).

Figure 1B:
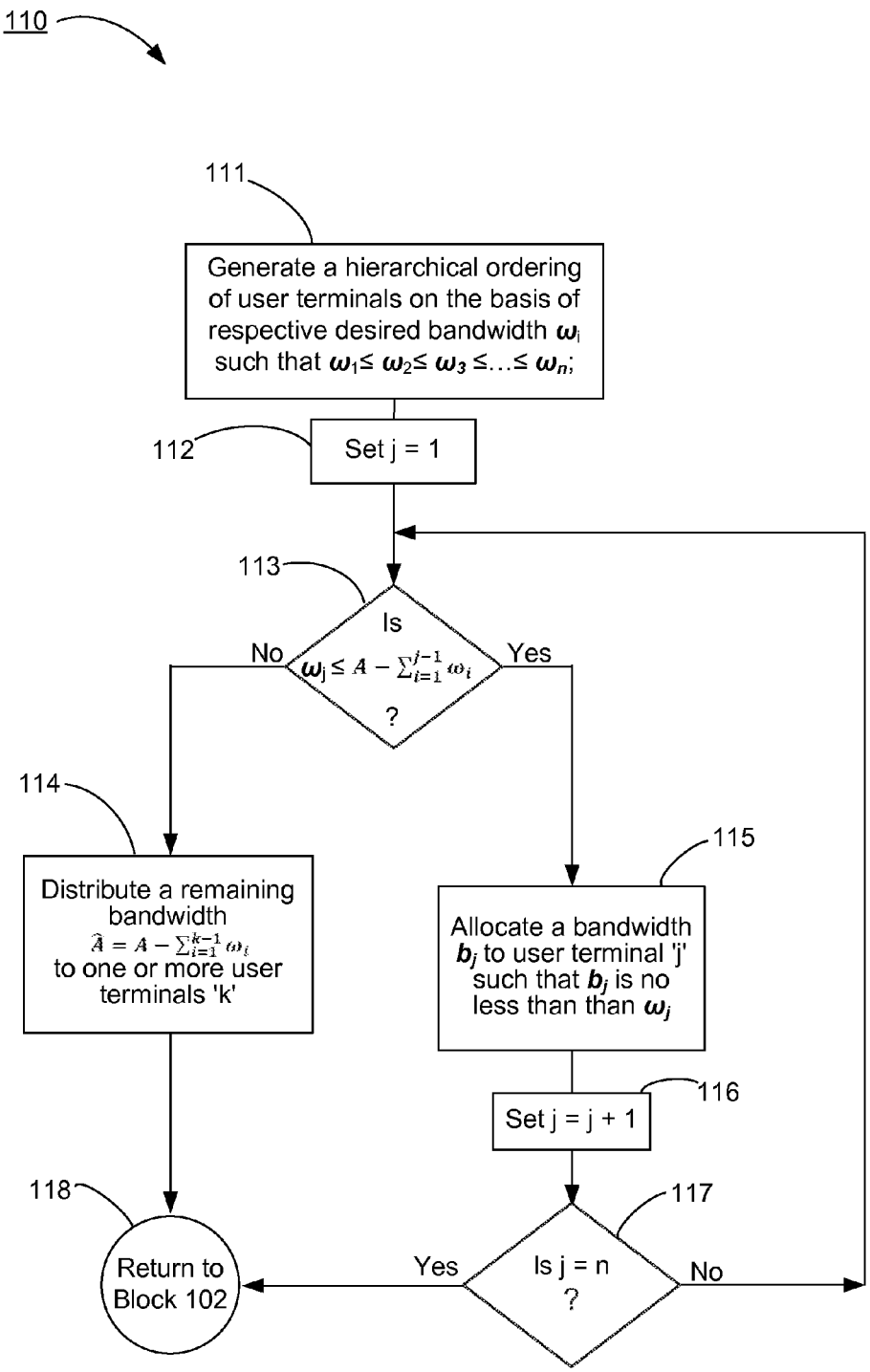

FIG. 1B shows a further example of a flow diagram illustrating an optimized technique for allocating bandwidth. More particularly FIG. 1B illustrates in more detail an implementation of block 110.

According to the illustrated implementation, at block 111, a hierarchical ordering of user terminals may be generated on the basis of respective desired bandwidth $\omega_i$, such that $\omega_1 \leq \omega_2 \leq \omega_3 \leq \ldots \leq \omega_n$.

At block 112, j may be set, initially, to equal 1. At block 113 a determination may be made whether or not $\omega_j \leq A - \Sigma_{i=1}^{j-1} \omega_i$.

If a determination is made at block 113 that $\omega_j \leq A - \Sigma_{i=1}^{j-1} \omega_i$, the method may proceed to block 115 where a bandwidth $b_j$ may be allocated to user terminal j such that $b_j$ is no less than than $\omega_j$. At block 116, j may be incremented, that is j may be set to equal j+1. At block 117, a determination may be made whether or not j equals n. When the determination is made that j does not equal n, the method may return to block 115. On the other hand, when the determination is made that j equals n, the method may return to block 102 (FIG. 1A).

When a determination is made at block 113 that $\omega_j > A - \Sigma_{i=1}^{j-1} \omega_i$, a remaining bandwidth $\hat{A} \times \omega_i / \Sigma_{i=k}^{n} \omega_i$ may be distributed to one or more user terminals to which bandwidth has not been previously allocated. In an embodiment, each such user terminal k may be allocated a portion of the remaining bandwidth $\hat{A}$ such that the allocated respective bandwidth $b_k$ for each user terminal k is approximately $\hat{A} \times \omega_i / \Sigma_{i=k}^{n} \omega_i$.

Figure 2:
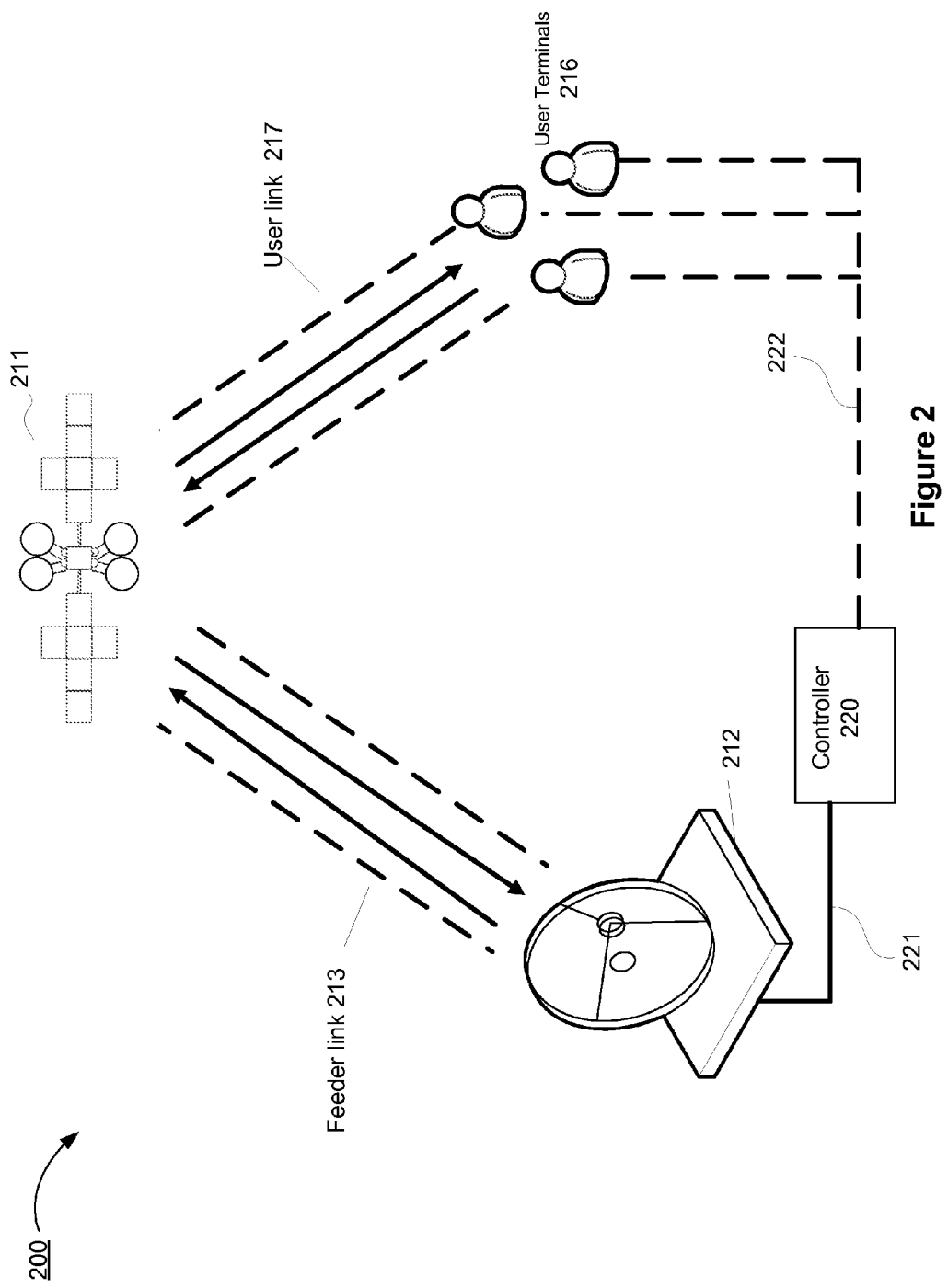
FIG. 2 shows an example system for implementing an optimized technique for allocating a satellite system resource according to an embodiment.

Referring now to FIG. 2, system 200 illustrates satellite 211 configured for data communication via a common antenna beam (not illustrated) with a number of user terminals 216. The data communication may be carried out over bidirectional user link 217 within the common antenna beam. Satellite 211 and user terminals 216 may be communicatively coupled, directly or indirectly, with controller 220. In the illustrated embodiment, for example, satellite 211 is communicatively coupled, via feeder link 213, with gateway ground terminal 212, which is communicatively coupled with controller 220 via signal line 221. User terminals 216 may be communicatively coupled directly with controller 220, as illustrated, via signal line 222. In addition, or alternatively, user terminals 216 may be communicatively coupled with controller 220 via user link 217, satellite 211, feeder link 213, gateway 212, and signal lines 221.

Controller 220 may be configured to dynamically allocate a resource to each user terminal using the above-described techniques. More particularly, controller 220 may be configured to make determination of (1) initially available bandwidth A and (2) total initially desired bandwidth $\Omega$, where $\Omega = \Sigma_{i=1}^{n} \omega_i$ and $\omega_i = T_{i\text{-}des}/s_i$. Advantageously, estimates of A and $\Omega$ may be updated dynamically in real, or near real time, based, for example, on continuously or frequently updated values of n, $T_{i\text{-}des}$, and $s_i$.

Controller 220 may be configured to periodically update the above determination. The update may be made continuously or at intervals of a few seconds or minutes, for example. Controller 220 may be further configured to determine whether or not $A > \Omega$. If $A > \Omega$, then controller 220 may allocate a bandwidth $b_i$ to each user terminal i such that $b_i$ is no less than than $\omega_i$. On the other hand, if $A < \Omega$, controller 220 may allocate a bandwidth $b_i$ to each user terminal i such that an aggregate number of user terminals supplied respective bandwidth not less than $\omega_i$, is maximized.

Thus, techniques for optimizing allocation of satellite system resources to user terminals has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for allocating resources to each of a plurality of user terminals, the user terminals configured for data communication with a satellite via a common antenna beam, the method comprising:
    dynamically allocating, within the common antenna beam, a bandwidth $b_i$ to each user terminal i such that, when total available bandwidth A of the common antenna beam is not less than the total desired bandwidth $\Omega = \Sigma_{i=1}^{n} \omega_i$ of the antenna beam, $b_i$ is no less than $\omega_i$, where:
        $\omega_i$, is bandwidth demand at user terminal i, approximately equal to $T_{i\text{-}des}/s_i$;
        $T_{i\text{-}des}$ is proportional to a throughput requirement by user terminal i; and
        $s_i$ is an estimated spectral efficiency of user terminal i;
        and, when A is less than $\Omega$, allocating the bandwidth $b_i$ to each user terminal such that a number of user terminals supplied respective bandwidth not less than $\omega_i$, is maximized.

2. The method of claim 1, where $b_i$ is no greater than $A/\Omega \times \omega_i$.

3. The method of claim 1, wherein, when A is less than $\Omega$, a first portion $A_1$ of bandwidth A is assigned to satisfy respective bandwidth demand $\omega_i$ of each user terminal of a first subset of the user terminals and a second portion $A_2$ of bandwidth A is proportionately assigned to partially satisfy each user terminal of a second subset of the user terminals.

4. The method of claim 3, wherein no user terminal in the first subset of user terminals has a respective bandwidth demand greater than a respective bandwidth of any user terminal in the second subset of terminals.

5. The method of claim 4, further comprising:
    generating a hierarchical ordering of user terminals on the basis of a respective $\omega_i$ such that $\omega_1 \leq \omega_2 \leq \omega_3 \leq \ldots \leq \omega_n$, wherein:
        for a first subset of user terminals, for which $\omega_j$ is not greater than $A - \Sigma_{i=1}^{j-1} \omega_i$, each terminal in the first subset is allocated respective bandwidth $b_i$ of not less than $\omega_i$; and
        for a second subset of user terminals, for which $\omega_k$ is greater than $A - \Sigma_{i=1}^{k-1} \omega_i$, a remaining bandwidth $\hat{A} = A - \Sigma_{i=1}^{k-1} \omega_i$ is allocated to one or more user terminals in the second subset.

6. The method of claim 5, wherein wherein $b_i$ is approximately equal to $\omega_i$.

7. The method of claim 5, wherein the remaining bandwidth $\hat{A}$ is allocated to each of the one or more user terminals in the second subset such that the allocated respective bandwidth $b_k$ for each user terminal in the second subset of terminals is approximately $\hat{A} \times \omega_i / \Sigma_{i=k}^{n} \omega_i$.

8. A method for allocating resources to each of a plurality of user terminals, the user terminals configured for data communication with a satellite via a common antenna beam, the method comprising:
    dynamically allocating a resource $r_i$ to each user terminal i such that, when the total resource A allocated to the antenna beam is not less than the total desired resource $\Omega$ of the antenna beam, $r_i$ is approximately equal to $A/\Omega \times \omega_i$, where $\omega_i$ is resource demand at user terminal i, approximately proportional to $d_i/s_i$, where $d_i$ is proportional to a throughput requirement per user terminal i and $s_i$ is an estimated spectral efficiency at user terminal i; and, when A is less than $\Omega$, allocating resource $r_i$ to each user terminal such that a number of user terminals supplied a respective resource not less than $\omega_i$ is maximized.

9. A satellite configured for data communication via a common antenna beam with a plurality of user terminals, wherein:
the satellite and the plurality of user terminals are communicatively coupled with a controller, the controller configured to control the allocation of resources to each of a plurality of user terminals, by:
dynamically allocating, within the common antenna beam, a bandwidth $b_i$ to each user terminal i such that, when total available bandwidth A of the common antenna beam is not less than the total desired bandwidth $\Omega=\Sigma_{i=1}^{n} \omega_i$ of the antenna beam, $b_i$ is no less than $\omega_i$ where:
$\omega_i$ is bandwidth demand at user terminal i, approximately equal to $T_{i\text{-}des}/s_i$;
$T_{i\text{-}des}$ is proportional to a throughput requirement by user terminal i; and
$s_i$ is an estimated spectral efficiency of user terminal i; and, when A is less than $\Omega$, allocating the bandwidth $b_i$ to each user terminal such that a number of user terminals supplied respective bandwidth not less than $\omega_i$, is maximized.

10. The satellite of claim 9, where $b_i$ is no greater than $A/\Omega \times \omega_i$.

11. The satellite of claim 9, wherein, when A is less than $\Omega$, a first portion $A_1$ of bandwidth A is assigned to satisfy respective bandwidth demand $\omega_i$ of each user terminal of a first subset of the user terminals and a second portion $A_2$ of bandwidth A is proportionately assigned to partially satisfy each user terminal of a second subset of the user terminals.

12. The satellite of claim 11, wherein no user terminal in the first subset of user terminals has a respective bandwidth demand greater than a respective bandwidth of any user terminal in the second subset of terminals.

13. The satellite of claim 12, wherein the controller is further configured to control the allocation of resources to each of the plurality of user terminals, by:
generating a hierarchical ordering of user terminals on the basis of a respective $\omega_i$, such that $\omega_1 \leq \omega_2 \leq \omega_3 \leq \ldots \leq \omega_n$, wherein:
for a first subset of user terminals, for which $\omega_j$ is not greater than $A-\Sigma_{i=1}^{j-1} \omega_i$, each terminal in the first subset is allocated respective bandwidth $b_i$ of not less than $\omega_i$; and
for a second subset of user terminals, for which $\omega_k$ is greater than $A-\Sigma_{i=1}^{k-1} \omega_i$, a remaining bandwidth $\hat{A}=A-\Sigma_{i=1}^{k-1} \omega_i$ is allocated to one or more of user terminals in the second subset.

14. The satellite of claim 13, wherein wherein $b_i$ is approximately equal to $\omega_i$.

15. The satellite of claim 14, wherein the remaining bandwidth $\hat{A}$ is allocated to each of the one or more user terminals in the second subset such that the allocated respective bandwidth $b_k$ for each user terminal in the second subset of terminals is approximately $\hat{A} \times \omega_i / \Sigma_{i=k}^{n} \omega_i$.

* * * * *